Patented Sept. 13, 1949

2,481,715

UNITED STATES PATENT OFFICE 2,481,715

THEOPHYLLINE-ETHYLENEDIAMINE COMPOUND AND METHOD OF PREPARING SAME

Auguste M. Black, Rahway, and John F. Mahoney, Linden, N. J., assignors to Merck & Co., Inc., Rahway, N. J., a corporation of New Jersey No Drawing. Application February 26, 1947, Serial No. 731,044

8 Claims. (Cl. 260—253)

This invention relates to the preparation of novel compounds of theophylline. It is particularly concerned with the preparation of water soluble theophylline-ethylenediamine compounds capable of producing relatively stable aqueous solutions.

Theophylline, a well known, therapeutically useful substance, lacks the property of solubility in water, desirable for the absorption by the human body. Attempts have been made to react theophylline (a very weak acid), with bases for the purpose of forming salts useful in the preparation of solutions of theophylline, suitable, for example, for subcutaneous injections.

Solutions for therapeutical purposes, even if fairly concentrated, should not have an alkaline reaction; common inorganic bases, are therefore unsuitable for this purpose.

Ethylene diamine has been found to be a preferred base for the reaction with theophylline. Usually 1 or 2 moles of theophylline are reacted with 1 mole of ethylene-diamine to form a water soluble product.

These compounds, however, are not stable even under ordinary atmospheric conditions. For example, the theophylline-ethylenediamine U. S. P., containing 12.3 to about 13.8% ethylenediamine is an extremely unstable compound. On exposure to air or by heating to approximately 40° C. under reduced pressure the compound decomposes by losing ethylenediamine. The aqueous solutions of theophylline-ethylenediamine U. S. P. are equally unstable: a 10% solution begins to precipitate free theophylline after an exposure to air for about 30 seconds.

We have now discovered that comparatively stable aqueous solutions of theophylline-ethylenediamine can be prepared. In accordance with the novel method of the invention herein disclosed, 3 moles of theophylline are reacted with 2 moles of ethylenediamine to produce a new compound characterized by an unusual content of ethylenediamine, i. e. 16.8%.

Table

| Molecular ratios | | Molecular weight | Ethylenediamine Content |
|---|---|---|---|
| Theophylline Monohydrate | Ethylenediamine | | |
| | | | Per Cent |
| 1 | 1 | 258 | 23.2 |
| 3 | 2 | 714 | 16.8 |
| 2 | 1 | 310 | 13.2 |

Thus a content of 16.8% of ethylenediamine indicates a molar ratio of 3 mols. theophylline to 2 mols. ethylenediamine.

This new compound is relatively stable, highly soluble in water and the resulting solution has a remarkable degree of stability. The compound may be stored in a well ventilated oven at 40° C. for about 5 days without losing an appreciable amount of ethylenediamine, and heating to 60° C. at 1–2 mm. pressure for 18–20 hours resulted in a loss of only 0.45% ethylenediamine. A 10% aqueous solution of the compound will remain clear for hours even after seeding with free theophylline; the 20% solution is stable for ½ to about 12 hours and the less concentrated solutions were observed to remain clear for about 24 hours.

The reaction is preferably carried out by first dissolving the theophylline in a weak organic base such as pyridine, α-picoline, quinoline and the like. An aqueous solution of ethylenediamine is then added. The resulting compound contained consistently 16.8% of ethylenediamine even if the amount of ethylenediamine used was varied from 20% deficiency to 100% excess over the theoretical requirement. The pyridine solvent may be diluted with alcohol to the extent of about 50% without affecting the composition of the final product.

The new compound was isolated as a white crystalline solid, optically inactive, soluble in excess alkali or acid and insoluble in alcohol and ether.

The following examples illustrate a method of carrying out the present invention, but it is to be understood that these examples are given by way of illustration and not of limitation.

*Example 1*

1600 cc. of pyridine were heated almost to boiling and 180 g. (1 mole) of anhydrous theophylline were dissolved therein under stirring. 60 g. of a 70% solution of ethylenediamine in water were added, and the reaction mixture was allowed to cool slowly to room temperature (25° C.). It was then stirred slowly and cooled further to 5° C. After filtering off the pyridine, the precipitate was thoroughly washed with 200 cc. absolute alcohol containing 3 g. of 70% aqueous ethylene diamine and then with U. S. P. ether, to remove all traces of pyridine. The final product was dried under air at 25° C.

Yield: 208 g. (88.3%).

Assay of this material gave 16.8% ethylenediamine.

Example 2

198 g. (1 mole) of theophylline hydrate were disolved in 1600 cc. hot pyridine and 60 g. of a 70% ethylenediamine solution were added. The reaction mixture was treated as in Example 1.
Yield: 198 g.
Assay: 16.8% ethylenediamine.

Example 3

180 g. of anhydrous theophylline were treated as in Example 1, but α-picoline was used as a solvent instead of pyridine. A product with a 16.8% ethylenediamine content was obtained.

Modifications may be made in carrying out the present invention without departing from the spirit and scope thereof and the invention is to be limited only by the appended claims.

We claim:

1. The process for the preparation of a theophylline-ethylenediamine compound containing about 16.8% ethylenediamine, which comprises reacting at an elevated temperature a solution of theophylline in a weakly basic amine selected from the group consisting of pyrindine, α-picoline and quinoline with an aqueous solution of ethylenediamine, and cooling the reaction mixture to precipitate said compound.

2. The process for the preparation of a theophylline-ethylenediamine compound containing about 16.8% ethylenediamine, which comprises reacting at an elevated temperature a solution of theophylline in pyridine with an aqueous solution of ethylenediamine and cooling the reaction mixture to precipitate said compound.

3. The process for the preparation of a theophylline-ethylenediamine compound containing about 16.8% ethylenediamine, which comprises reacting at an elevated temperature a solution of theophylline in α-picoline with an aqueous solution of ethylenediamine and cooling the reaction mixture to precipitate said compound.

4. The process for the preparation of a theophylline-ethylenediamine compound containing about 16.8% ethylenediamine, which comprises reacting at an elevated temperature a solution of theophylline in quinoline with an aqueous solution of ethylenediamine and cooling the reaction mixture to precipitate said compound.

5. The process for the preparation of a theophylline-diamine compound containing about 16.8% ethylenediamine, which comprises reacting at an elevated temperature a solution of 3 moles of theophylline in a weakly basic amine selected from the group consisting of pyridine, α-picoline and quinoline with an aqueous solution containing 2 moles of ethylenediamine, cooling the reacting mixture to precipitate said compound, filtering and washing the precipitate.

6. The process for the preparation of a theophylline-diamine compound containing about 16.8% ethylenediamine, which comprises reacting at an elevated temperature a solution of theophylline in pyridine with a 70% aqueous solution of ethylenediamine, cooling the reaction mixture to precipitate said compound, filtering and washing the precipitate.

7. The process for the preparation of a theophylline-diamine compound containing about 16.8% ethylenediamine, which comprises reacting at an elevated temperature a solution of theophylline in pyridine with a 70% aqueous solution of ethylenediamine, cooling the reaction mixture to about 5° C. to precipitate said compounds, filtering and washing the precipitate.

8. A theophylline-ethylenediamine compound obtained by reacting a solution of 3 moles of theophylline in a weak organic base selected from the group consisting of pyridine, α-picoline and quinoline with an aqueous solution of 2 moles of ethylene diamine.

AUGUSTE M. BLACK.
JOHN F. MAHONEY.

REFERENCES CITED

The following references are of record in the file of this patent:

Chemical Abstracts, page 2719, vol. 37 (1943).